United States Patent [19]

Slocombe

[11] 3,944,535

[45] Mar. 16, 1976

[54] LOW TEMPERATURE SYNTHETIC RUBBER AND METHOD OF MAKING SAME

[75] Inventor: Robert J. Slocombe, Dayton, Ohio

[73] Assignee: The B. F. Goodrich Company, Akron, Ohio

[22] Filed: Apr. 18, 1955

[21] Appl. No.: 502,189

[52] U.S. Cl. ........ 260/94.3; 252/429 A; 260/42.32; 260/79.5 B; 260/82.1
[51] Int. Cl.² ...................... C08F 4/66; C08F 36/06
[58] Field of Search ....... 260/94.2, 94.3, 82.1, 93.7, 260/94.9

[56] References Cited
FOREIGN PATENTS OR APPLICATIONS

| | | | |
|---|---|---|---|
| 914,246 | 12/1962 | United Kingdom................ | 260/94.3 |
| 627,741 | 9/1961 | Canada.............................. | 260/94.3 |
| 215,043 | 11/1956 | Australia | |

OTHER PUBLICATIONS

Moyer et al., Jour. Poly. Sci., Part A, Vol. 3, pp. 217–229 (1965).

Short et al., Rubber Chem. & Technol. 30, 1118–1141, (1957).

Short et al., Rubber Chem. & Technol. 32, 614–627 (1959).

*Primary Examiner*—Edw. J. Smith
*Attorney, Agent, or Firm*—Ernest K. Bean; Robert W. Furlong; J. Hughes Powell, Jr.

[57] ABSTRACT

Butadiene or isoprene are polymerized in the presence of a catalyst prepared by the interaction of (a) an aluminum compound of the general formula $R_2AlX$ wherein R is an alkyl, cycloalkyl or aryl radical and X is hydrogen, halogen, or an alkyl, cycloalkyl or aryl radical, with (b) a metal halide selected from the group consisting of the chlorides, bromides and iodides of titanium and zirconium, the resulting polymer having a high degree of flexibility at low temperature.

2 Claims, No Drawings

LOW TEMPERATURE SYNTHETIC RUBBER AND METHOD OF MAKING SAME

This invention relates to the polymerization of butadiene and isoprene. In some of its aspects the invention pertains to the polymerization of butadiene alone, isoprene alone, or mixtures of butadiene with isoprene in any proportions to form a synethetic rubbery material having exceptional low temperature flexibility. In other aspects the invention provides a new type of polymeric material, i.e., high molecular weight rubbery polymers of butadiene or isoprene which are flexible at much lower temperatures than synthetic rubbers prepared from the same monomers under conventional conditions yet are stiffer than such conventional polymers at temperatures ranging from somewhat belwo room temperature and above. Still other aspects of the invention provide vulcanized polybutadiene or polyisoprene having the properties just mentioned. Yet other aspects of the invention provide improvements in the polymerization of butadiene and/or isoprene with catalysts exemplified by the material obtained by the interaction of a trialkylaluminum with titanium tetrachloride.

There is a great need for elastomeric materials which can be vulcanized, which have appreciable strength and body at the ordinary temperatures such as 0°C. on up to 100°C. and higher, while retaining flexibility at extremely low temperatures, such as minus 30° to minus 100°C. and even lower. Such materials are of particular importance to the military, for equipment to be used under arctic conditions, and particularly for aircraft, rockets, guided missiles and the like to be used at extremely high altitudes where very low temperatures are encountered.

The present invention provides an elastomeric material suitable for these uses, and having low temperature properties that are outstanding and indeed unique. The polymers prepared in accordance with the invention are rubbery, can be subjected to all of the conventional processing steps including incorporation of vulcanizing agents such as sulfur, accelerators, antioxidants, fillers, reinforcing agents, pigments, plasticizers, other polymers, and the like, can be milled, mixed in Banbury mixers, and handled in the various other ways known to the rubber industry, and can be formed by compression molding, extrusion, etc., into a wide variety of articles such as pneumatic tires for vehicles, gaskets, sealing rings, fabric coating, flexible tubing and the like, followed by vulcanization to produce a high strength article having excellent flexibility at extreme low temperatures.

The invention is carried out by polymerizing butadiene-1,3, or isoprene, or a mixture of butadiene and isoprene, in the presence or a catalyst prepared by the interaction of (a) an aluminum compound of the general formula $R_2AlX$ wherein R is an alkyl, cycloakly, or aryl radical and X is hydrogen, halogen, or an alkyl, cycloalkyl or aryl radical, with (b) a metal halide selected from the group consisting of the chlorides, bromides and iodides of titanium and zirconium. The practice of the various aspects of the invention will be described by way of example, with particular reference to catalysts prepared by the interaction of trialkylaluminums, e.g., triethylaluminum, triisobutylaluminum, triocylaluminum, with titanium tetrachloride. Particular reference will also be made to the use of butadiene, but it is to be understood that isoprene is also meant, and that mixtures of these two conjugated diolefin hydrocarbons can be employed in any proportion in order to obtain the desired physical characteristics.

While the polymerization of this invention can be carried out with a variety of combinations of variables, it is usually preferred to carry out the polymerization at a temperature below about 35°C., and/or by the use of trialkylaluminums containing long alkyl groups, e.g., those averaging at least 8 carbon atoms per alkyl group. These preferred procedures are desirable for the purpose of increasing the yield of the polymer.

Suitable aluminum compounds to be reacted with the chlorides, bromides or iodides of titanium or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

triethylaluminum
triisobutylaluminum
trioctylaluminum
didodecyloctylaluminum
diisobutylaluminum hydride
tridodecylaluminum
diphenylaluminum bromide
dipropylcyclohexylaluminum
ditolymethylaluminum
tri-($\beta$-phenylethyl)aluminum
diethylaluminum chloride
diisobutylaluminum chloride
diisobutylaluminum iodide
di($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc. of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mol ratio betweein 2.0:1 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds, and especially those ranging in boiling point up to 600°F. Also, benzene, toluene, ethylbenzene, cumene, decalin, ethylene dichloride, chlorobenzene, diethyl ether, o-dichlorobenzene, dibutyl ether, tetrahydrofurane, dioxane.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced.

The amount of catalyst required is dependent on the other variables of the polymerization reaction, and although amounts as small as 0.01 weight per cent based on total weight of monomers charged are sometimes permissible, it is usually desirable to use larger amounts, such as from 2 to 5 per cent or even considerably higher. When polymerization is effected in the presence of a solvent, the catalyst to solvent weight ratio should be at least about 0.003:1.

The diolefin monomer is contacted with the catalyst in any convenient manner. A suitable procedure is to introduce it into intimate contact with the catalyst, with agitation provided by suitable stirring or by bubbling the gaseous monomeric material into a liquid suspension of the catalyst, either in the total quantity of monomer to be used during the polymerization, or gradually by intermittent or continuous addition to the reaction mixture. It is desirable to provide at least enough agitation during the polymerization to effect adequate and intimate admixture of the butadiene (or isoprene or mixture of the two), with catalyst. Where the reaction is carried out at or near atmospheric pressure, it is convenient merely to bubble the butadiene into the reaction mixture, at a rate not greatly in excess of the maximum rate at which it is taken up by polymerization. When isoprene is being charged, it can be introduced gradually as a liquid, or as a gas if the temperature is somewhat elevated above room temperature. The reaction can be carried out batchwise by providing the total diolefin and catalyst in the reaction vessel, such as a mechanically stirred or shaken pressure bomb, into which is introduced the total diolefin to be used in the reaction. Preferably, however, especially in order to provide controlled reaction rates and avoid too great an extent of reaction during a limited period of time which would cause undesirably high and possibly dangerous rise in temperature and pressure, the diolefin is added to such a bomb intermittently or continuously at a rate adapted to maintain an essentially constant pressure, which may be about atmospheric, or even sub-atmospheric, which would seldom be advantageous, or often superatmospheric within the ranges described hereinafter. The polymerization of this invention is also readily adapted to continuous flow processes. For example, all the monomer plus catalyst can be admixed and passed continuously through an elongated reaction tube of comparatively small diameter, which is contacted externally with a suitable cooling medium to maintain desirable reaction temperature. The diolefin and/or the catalyst can be added multipointwise along the length of the reaction tube if desired. These and numerous other variations of carrying out the polymerization will be well understood by those skilled in the polymerization art.

The catalyst is sensitive to various poisons, among which may be mentioned oxygen, water, carbon dioxide, carbon monoxide, and acetylenic compounds such as acetylene, vinylacetylene, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The diolefin need not be pure diolefin so long as it is reasonably free from poisons. Thus, a mixture of butadiene with butanes, with or without some butenes, can be used, and such mixtures are readily obtainable from refinery gases and from butadiene manufacturing processes such as those involving dehydrogenation of butanes and butenes, thereby avoiding the treatment of same to provide the butadiene in highly concentrated form. However, it is preferred to separate the butadiene from other hydrocarbons and obtain a butadiene content in the feed of at least 75 weight per cent and preferably abour 90 weight per cent. The same consideration apply with respect to isoprene, which can be utilized in admixture with other close boiling hydrocarbons, including pentenes if desired, but which preferably ranges in purity from 75 to 90 per cent isoprene and higher. As has also been mentioned above, a variety of solvents can be present during the reaction.

The polymerization can be effected over a wide range of temperatures, such as from the boiling point of butadiene or isoprene at atmospheric or superatmospheric pressure down to say minus 40°C. and even lower. It is usually preferred that the temperature be maintained at about 30°C. or below. A temperature ranging up to 100°C. and higher is satisfactory. It is seldom advantageous, however, to exceed 50° or 60°C., and room temperature is quite satisfactory.

The polymerization reaction is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 psi. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The polybutadiene or polyisoprene is essentially insoluble in the usual solvents at room temperature and even at somewhat elevated temperatures, so that in most instances the polymer separates out as insoluble soft, rubbery flakes as it is formed. The reaction mixture can readily be worked up by filtering, centrifuging or otherwise removing the solid polymer from the liquid material. The solid polymer is then desirably washed with organic solvents for removal of catalyst residues which impart color to the polymer. It is often desirable to include a treatment with hydrochloric acid dissolved in a suitable organic solvent, e.g., methanol, and preferably with a small amount of water present, in order to obtain maximum removal of catalyst residues. The polymer can also be washed with isobutanol to effect considerable removal of catalytic material. Many other procedures and materials can be used to work up the products and all such can be employed without departing from the invention. When the rubber is to be used in a finished composition or article in which a light color is not essential, a simple separation of polymer followed by a single washing with organic solvent may often be sufficient, as catalyst residues that may remain in the polymer after such treatment will not be objectionable because of their color. However, if the rubber is to be used for electrical insulation applications, thorough removal of catalyst residues is desirable.

Butadiene is cheaper and more readily available than isoprene. Further, polybutadiene has a number of properties that make it superior to polyisoprene for many uses. Thus, butadiene is the preferred monomer in the practice of the invention. However, it is often desirable to copolymerize a mixture of butadiene with isoprene, the latter generally being present in the polymer in the smaller proportion by weight. An especially valuable copolymer contains from 95 to 70 weight per cent butadiene and correspondingly from 5 to 30 weight per cent isoprene, and is an elastomer having properties resembling those of the polybutadiene but of a somewhat broadened transition range and exceptional low temperature flexibility. A copolymer predominating in isoprene can be made containing, say, 10, 20, 30 or 40 weight per cent butadiene.

Sulfur is the preferred vulcanizing agent to use with the polymers of this invention. However, other vulcanizing agents, e.g., sulfur monochloride, are also effective. Zinc oxide is also a valuable component of mixes to be vulcanized. The following recipes are given by way of example of complete recipes suitable for curing the polymers of this invention to give desirable vulcanized compositions. Those skilled in the art, having had the benefit of these examples and the other information disclosed herein, will be able to devise a variety of other recipes suited to the particular intended use. In the following tabulation of recipes, the parts are by weight.

| RECIPE I | | RECIPE II | |
|---|---|---|---|
| Polybutadiene | 100.00 | Polyisoprene | 45.00 |
| Sulfur | 2.00 | Sulfur | 1.00 |
| Zinc oxide | 3.00 | Zinc oxide | 20.00 |
| Blanc Fixe (barium sulfate) | 55.00 | Whiting | 30.00 |
| | | Iron oxide (red) | 1.00 |
| Mercaptobenzothiazole (zinc salt) | 1.00 | Chrome yellow | 0.50 |
| Tetramethylthiuram monosulfide | 0.25 | Lamp black | 0.30 |
| | | Mercaptobenzothiazole | 0.50 |
| Stearic acid | 1.25 | Diphenylguanidine | 0.10 |
| Vulcanized by heating 6 min. at 310°F. | | Vulcanized by heating at 260°F. for 1 hour. | |

| RECIPE III | |
|---|---|
| Butadiene 85/isoprene 15 copolymer | 100.00 |
| Sulfur | 2.50 |
| Zinc oxide | 5.00 |
| EPC carbon black | 45.00 |
| Mercaptobenzothiazole | 1.00 to 1.5 |
| Paraflux | 10.00 |
| Vulcanized by heating at 260–275°F. for 5 min. per 1/32" thickness. | |

The components of the various mixtures indicated above are brought into intimate admixture with each other in the usual way, as on mill rolls. As reinforcing agents, furnace, channel or acetylene black are all suitable although of course the properties of the final product will be dependent upon the particular black chosen as well as upon other factors. The furnace blacks are preferred in many instances. Of particular interest are the semi-reinforcing blacks (SRF) such as "Furnex", the high abrasion furnace blacks (HAF) such as "Philblack"—A and —O and "Statex" —R, and the superabrasion furnace blacks (SAF) such as "Vulcan" —9. Black loading will naturally be dependent upon the properties desired in the final product, but in general will be within the range of 10 to 70 phr and preferably 20 to 50 phr (parts carbon black by weight per 100 parts rubber by weight). In addition to or instead of carbon black, other typical rubber reinforcing agents, e.g., finely divided silicas, can be employed. Also, fillers such as clays and the like, pigments, softeners, age-resistors, vulcanization accelerators, curing agents, etc. can be employed in proportions chosen to fit the end use of the compound rubber. Among the well-known materials commericially available and from which choice can be made as desired, there can be mentioned by way of example clay, magnesium oxide, lead dioxide, calcium oxide, calcium carbonate, iron oxide, titanium dioxide, pumice, powdered leather, asbestoc fibers, pine tar, Neozone D, sodium acetate, Santocure, Neozone A, Ureka C, El-Sixty, Captax, zinc laurate, diphenyl guanidine, Bardol, Carbonex, Polyac, Akroflex C, Acrowax C, Methyl Tuads, Altax; the compositions of those materials mentioned by trade-name are well known to those skilled in the art, and can be ascertained by reference to the literature of the manufacturers as well as standard reference works on chemical trade-names.

The following specific example is given by way of illustration of one suitable combination of catalyst, conditions for catalyst preparation, polymerization conditions, and methods of working up the product. It will be understood, however, that variations from the exact details given can be made without departing from the invention.

EXAMPLE

A 500-ml. flask was set up with motor stirrer, thermometer, condenser, nitrogen inlet and funnels for adding catalyst components. These funnels were also equipped with nitrogen tubes. Lamp grade nitrogen was used to flush the reactor and addition funnels to avoid contact of catalyst components and reaction mixture with air. A sparger tube was provided for introduction of butadiene, the tube dipping into the liquid reaction mixture to a point just above the stirrer blade. Gaseous butadiene was first passed through a bubbler to determine the approximate rate of addition and then into the reactor through the sparger tube just described. Unreacted gas flow rate was approximated by passing it from the end of the condenser through a bubbler.

To the reactor was added 1.14 gram triethylaluminum in 100 ml. kerosene. There was then added dropwise 2.85 grams $TiCl_4$ in 50 ml. kerosene while stirring, followed by 50 ml. more kerosene. This was an Al:Ti mol ratio of 0.67:1. The catalyst mixture was stirred 10 minutes, and then addition of gaseous butadiene started.

Absorption of butadiene gas was quite rapid, and slowed only to a limited extent during the latter part of the run. The butadiene addition was continued for a period of 4 hours, 45 minutes, following which the reactor was sealed under nitrogen.

After standing overnight, the reaction mixture was treated with 200 ml. methanol containing 10 ml. concentrated aqueous HCl, stirred 30 minutes, and filtered; the solids were washed several times with acetone until washings were colorless, and placed in the vacuum oven to dry.

During the run butadiene was bubbled through the reaction mixture at a rate considerably faster than the rate of polymerization. A total of 41 grams butadiene was passed into the reactor, and the dried polymer recovered was 6.4 grams.

During the entire run the reactor had been held at room temperature, increased slightly by the heat of polymerization so that the actual temperature in the reactor ranged from 27° to 32°C. The pressure was atmospheric.

The polybutadiene product was molded by compression molding into a test sample which was subjected to the Clash-Berg test. This is a measure of the stiffness of a plastic specimen as a function of temperature, measured by means of a torsional test. It is essentially that described by Clash and Berg, Ind. Eng. Chem. 34, 1218 (1942). The brittle temperature ($T_f$) is the temperature at which the rigidity modulus is 135,000 psi. The rubber temperature ($T_{2000}$) is the temperature at which the rigidity modulus is 2000 psi.

This polymer showed outstanding low temperature properties in the Clash-Berg test. The rigidity modulus-temperature curve thus obtained was nearly linear. The $T_{2000}$ was minus 12°C., which is markedly higher than the $T_{2000}$ for polybutadienes prepared by conventional polymerization processes, such as emulsion polymerization. On the other hand, at minus 75°C. (the lowest temperature available in the test equipment) the modulus was only 12,000 psi. The 12,000 psi modulus is reached by conventional polybutadienes at considerably higher temperatures. Thus, the slope of the modulus-temperature curve for the polybutadiene of this invention is less than the corresponding slope for conventional polybutadienes, which means that the temperature range between the two given moduls values is much greater for the material of this invention.

By extrapolation of the curve, the $T_f$ was estimated to be minus 167°C. Thus, the estimated Stifflex Range (SR) was 155°C. (The Stifflex Range is defined as $T_{2000}$ minus $T_f$).

From these data it is apparent that this polybutadiene has a much lower second order transition temperature (approximated by $T_f$) than conventional polybutadiene, and yet is much stiffer at ordinary atmospheric temperatures. This very broad transition range is of much importance in practical applications of the rubber.

This polymer when subjected to the action of various solvents at romm temperature over a period of one day was insoluble in gasoline and in ethylene dichloride, and was swollen by carbon tetrachloride and by benzene.

This polybutadiene can be readily vulcanized by any of the conventional vulcanization recipes, such as those employing sulfur. One suitable recipe is that given above under the heading Recipe III, with 100 parts of this polybutadiene being used in place of the 100 parts copolymer. This mix, on heating at 140°C. for 5 minutes per 1/32 inch thickness, gives a tough vulcanized polybutadiene of outstanding low temperature flexibility and broad transition range.

It may be noted that in compounding recipes involving the use of carbon black or various fillers, reinforcing agents or pigments, such as clay, calcium carbonate, etc., in which the final product need not be light colored for the intended use, the fresh polymer need not be subjected to such severe washing and treatment for removal of catalyst residues as is given in the proceding example.

While the invention has been described herein with particular reference to prefeerred embodiments thereof, it will be appreciated that variations from the details given herein can be effected without departing from the invention in its btoadest aspects.

I claim:

1. A method for polymerizing 1,3-butadiene which comprises contacting said 1,3-butadiene with a catalyst consisting essentially of (a) a compound corresponding to the formula $R_3Al$, wherein R is an alkyl radical having 2 to 4 carbon atoms and (b) titanium tetraiodide.

2. A process for producing rubbery vulcanizable polybutadiene which is characterized by improved flexibility at low temperatures, which process comprises polymerizing butadiene-1,3 in an inert hydrocarbon medium in the presence of a catalyst resulting from the interaction in said medium of (a) a trialkyl aluminum of the formula $R_3Al$ wherein R is an alkyl radical containing 2 to 8 carbon atoms and (b) titanium tetraiodide, the mole ratio of aluminum to titanium being from 0.3 to 1 to 15 to 1.

* * * * *